US00RE39063E

(19) United States
(12) Reissued Patent
Ratliff et al.

(10) Patent Number: US RE39,063 E
(45) Date of Reissued Patent: Apr. 18, 2006

(54) AIRPORT BRIDGE AND LIFT

(75) Inventors: William Clay Ratliff, Burleson, TX (US); Frederick C. Keish, Fort Worth, TX (US)

(73) Assignee: Fredrick Keish, Kennedale, TX (US)

(21) Appl. No.: 10/944,698

(22) Filed: Sep. 17, 2004

Related U.S. Patent Documents

Reissue of:
(64) Patent No.: 6,658,685
Issued: Dec. 9, 2003
Appl. No.: 10/192,450
Filed: Jul. 10, 2002

(51) Int. Cl.
*E01D 12/00* (2006.01)
*B65G 67/00* (2006.01)

(52) U.S. Cl. ..... 14/71.5; 414/391
(58) Field of Classification Search ..... 14/71.5; 186/22; 414/391
See application file for complete search history.

(56) References Cited

U.S. PATENT DOCUMENTS 1,081,259 A * 12/1913 Wilson ..... 186/22
1,923,034 A * 8/1933 Henricksen ..... 187/255
2,700,169 A * 1/1955 Henion
3,099,847 A * 8/1963 Lodjic et al.
3,377,638 A * 4/1968 Seipos
3,581,331 A * 6/1971 Fisher et al.
3,679,071 A * 7/1972 Smith ..... 414/10
3,757,897 A * 9/1973 Moulson et al. ..... 414/618
3,757,898 A * 9/1973 Mitchell et al. ..... 187/205
3,916,588 A * 11/1975 Magill ..... 52/30
4,161,049 A * 7/1979 Saunders et al.
4,176,732 A * 12/1979 Nordskog ..... 187/244
4,469,198 A 9/1984 Crump
4,488,326 A * 12/1984 Cherry ..... 14/72.5
4,559,660 A * 12/1985 Lichti
4,697,977 A * 10/1987 Loomer et al. ..... 414/662
5,074,496 A 12/1991 Rezag et al.
5,267,368 A * 12/1993 Saunders
D383,216 S * 9/1997 Anderberg
5,667,035 A 9/1997 Hughes
D386,263 S * 11/1997 Anderberg (Continued)

OTHER PUBLICATIONS

Thomas Telford House, Custom–made solutions with inbuilt flexibility for the industry. Oct. 24, 2000; Sec. No. 8, vol. 33; p. 15; 0002–2853; Thomas Telford Ltd, U.K.
Sherilee Clinch, Atlanta stresses its social side. Oct. 10, 2000; Sec. No. 7, vol. 33; p. 18; 0002–2853; Thomas Telford Ltd, U.K.
Jackie Potbier, A bridge further. 2000. Passenger Terminal 2000; pp. 142–144; DEW Engineering.
Jackie Potbier, Mind the gap. 2001, Passenger Terminal 2001; pp. 157–159; DEW Engineering.
DEW–VALET Baggage System; Oct. 15, 1999; pp. 1–25; DEW–BRIDGE.
Nova BridgeLift; Airport Automation Corp. website; http://www.airportautomation.com/intro.html; no date.

*Primary Examiner*—Raymond W Addie
(74) *Attorney, Agent, or Firm*—Geoffrey A. Mantooth; L. Bruce Terry

(57) ABSTRACT

A lift is coupled to the outer cab of a telescoping bridge. The lift has a carriage that can be moved by a cable and a motor upward or downward and which includes a platform that has sensing means for controlling the motor for stopping downward movement of the carriage when it engages the ground. An electrically operated safety catch is provided to prevent the carriage from falling in the event the cable breaks. A safety system is provided which prevents the bridge from moving if the carriage is not in the up position and its door is not closed.

5 Claims, 16 Drawing Sheets

U.S. PATENT DOCUMENTS 5,704,086 A * 1/1998 Hansen et al.
5,761,757 A * 6/1998 Mitchell et al.
5,791,003 A * 8/1998 Streeter et al.
5,855,035 A * 1/1999 Streeter et al.
5,950,266 A * 9/1999 Streeter et al.
6,105,728 A 8/2000 Combs, Jr.
6,109,854 A 8/2000 Thompson et al.
6,122,789 A * 9/2000 Stephenson et al.
6,167,670 B1 1/2001 Reite et al.
6,212,724 B1 * 4/2001 Zhou
6,390,757 B1 5/2002 Ganiere
6,676,359 B1 * 1/2004 Ganiere ..... 414/391
2002/0084148 A1 7/2002 Nygren

* cited by examiner 105
103
107
111A
111B
111C
113
4
5
121
122
123
124
125
126
127
128
129
130

225
213
325
227
223
319
221
343
401
235
233
231
211
401

227
221
323
12
11
217
216A
237
231
12
11
223
219
216B
216C
216A
211
233

343
343U 343
347
305
309
227
277
307
323
225
303
221
223
273
325
301

345
357
361
347
351
355
347
341
353
359

223
341
211
233
341
213

300
300
CR1 - Run
CR4 - Interlock
CR2 - UP
CR3 - DOWN
453

140B
473
BYPASS
CR4
LS1 - Door
NOHC
CR1
UP 1
UP 2
DN 1
DN 2
ESTOP2
ESTOP1
140A
471
455
457
CR3
CR2
LS2 - Up Travel
NOHC
459
461
451
305
1 DISC
1 FU
20 Amp
3
3
3
3
3
8
8
10
12
5
4
7
9
11

AIRPORT BRIDGE AND LIFT

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a bridge with a lift for use for the passage of passengers and luggage between an airport and an airplane.

2. Description of the Prior Art

U.S. Pat. No. 5,704,086 discloses a telescoping bridge or tunnel comprising an inner rotunda coupled to an airport, and a telescoping walkway or tunnel coupled between the rotunda and an outer cab to be coupled to the door of an airplane for passengers and small luggage. The bridge of the patent can be expanded and retracted and be rotated about a vertical axis at the rotunda. In each telescoping pair of bridge sections, the inner bridge section telescopes within its adjacent outer bridge section.

In another known telescoping bridge in use, in each telescoping pair of bridge sections, the outer bridge section telescopes into its adjacent inner bridge section.

Another known bridge in use is fixed in place and cannot telescope and hence cannot be expanded and retracted.

These bridges are used for the passage of passengers and small carry on luggage to and from the airplane. Large luggage is checked at the ticket counter and loaded and unloaded separately.

In the operation of smaller regional airplanes, the trend is to allow the passengers to carry their larger luggage beyond the ticket counter to the bridge. Airline personnel then can take the luggage to the airplane and load it into the aircraft cargo hold. One known non-telescoping bridge section has a lift attached thereto near the airport building whereby large luggage can be lowered to the ground and then transported to the airplane. Other known lifts are attached to a bridge and use chutes, ramps, or stairs for unloading luggage.

SUMMARY OF THE INVENTION

It is an object of the invention to provide a unique lift which can be attached to a telescoping bridge at its outer cab.

The lift has a carriage that can be moved by a cable and a motor upward or downward and which comprises a platform that has sensing means for controlling the motor for stopping downward movement of the carriage when it engages the ground An electrically operated safety catch is provided to prevent the carriage from falling in the event the cable breaks.

A safety system is provided which prevents the bridge from moving if the carriage is not in the up position and the door to the carriage is not closed.

BRIEF DESCRIPTION OF THE DRAWINGS

In FIG. 6, the bridge section is shown as a line drawing.

FIG. 18 is a left side view of the lift of FIG. 17.

FIG. 19 is a top view of the lift of FIG. 17.

FIG. 20 is a side view of one of the safety catch devices of the lift with the catch in an out of the way position.

FIG. 21 is a side view of a portion of the catch device of

FIG. 22 illustrates the U-shape support of the catch device.

FIG. 24 is a side view of the platform of FIG. 24.

In FIG. 37 the rear wheels are not shown for purposes of clarity.

DESCRIPTION OF THE PREFERRED EMBODIMENTS

Figure 1:
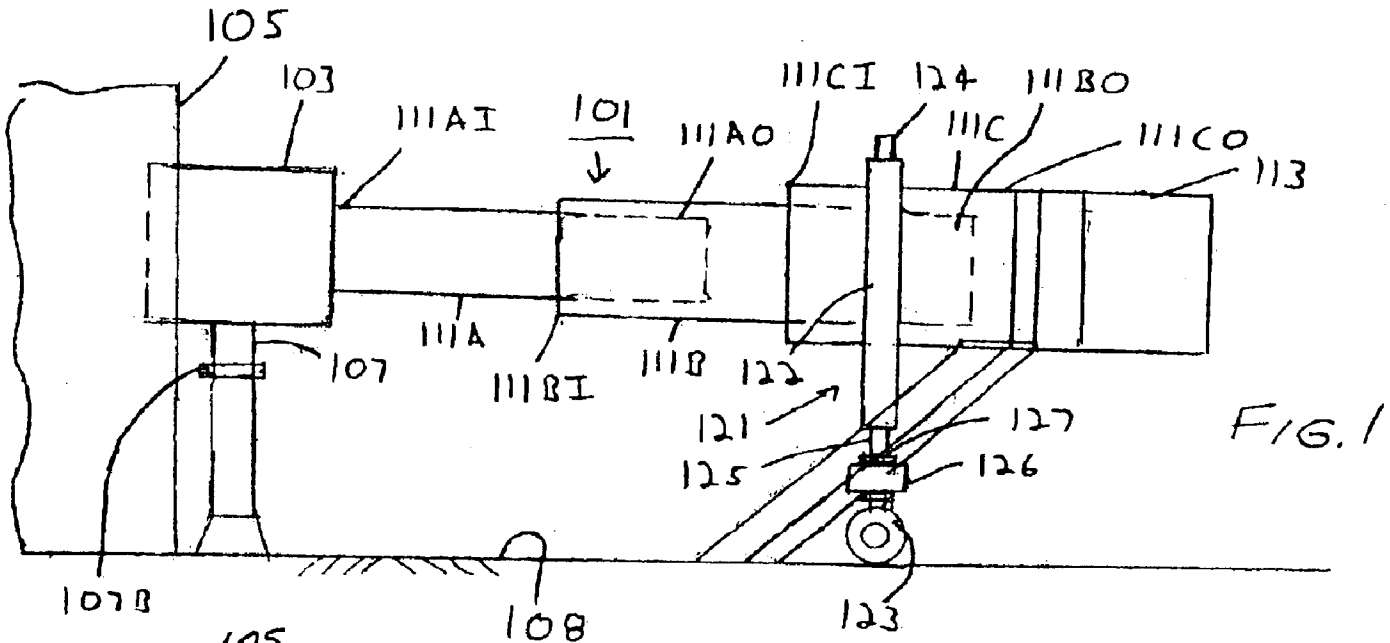
FIG. 1 is a side view of a bridge and the lift of the invention with the bridge in a retracted position.
Figure 2:
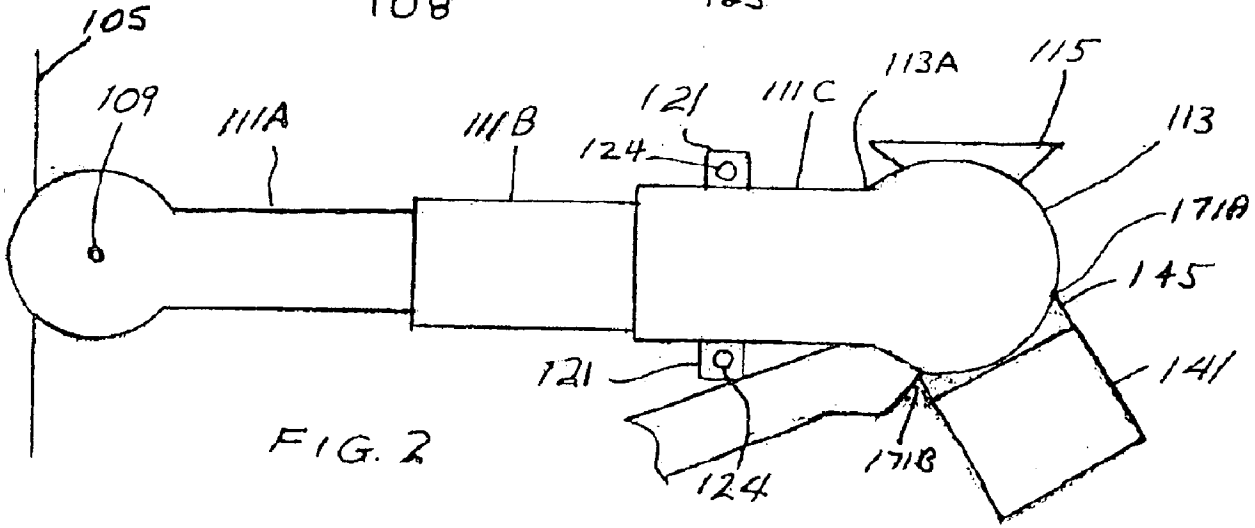
FIG. 2 is a top view of the apparatus of FIG. 1.

Referring now to FIGS. 1–8 there will be described a bridge and the lift of the invention. The bridge 101 is similar to that disclosed in U.S. Pat. No. 5,704,086, which patent is incorporated into this application by reference. The bridge 101 is of the telescoping type. The bridge 101 comprises a rotunda 103 which is coupled to an airport structure 105. The rotunda is supported by a pedestal 107 which is coupled to the ground by way of bearings 107B such that the rotunda can rotate about a vertical axis 109. The rotunda has an interior zone for the passage of passengers. Three hollow tunnel or bridge sections 111A, 111B, and 111C are coupled to the rotunda 103. The sections 11A, 11B, 11C are rectangular in cross-section. The bridge section MA has its inner end 111AI fixedly coupled to the rotunda 103 and its outer end 111A) telescopically located in the inner end 111BI of section 111B. The outer end 111BO of section 111E is telescopically located in the inner end 111C1 of section 111C. The outer end 111CO of section 111C is fixedly coupled to a bubble shaped cab 113 having an interior zone for the passage of passengers. The cab 113 has a port 115 adapted to be coupled to a front door of an airplane-for the passage of passengers and small luggage.

Figures 3, 4, 5, 6:
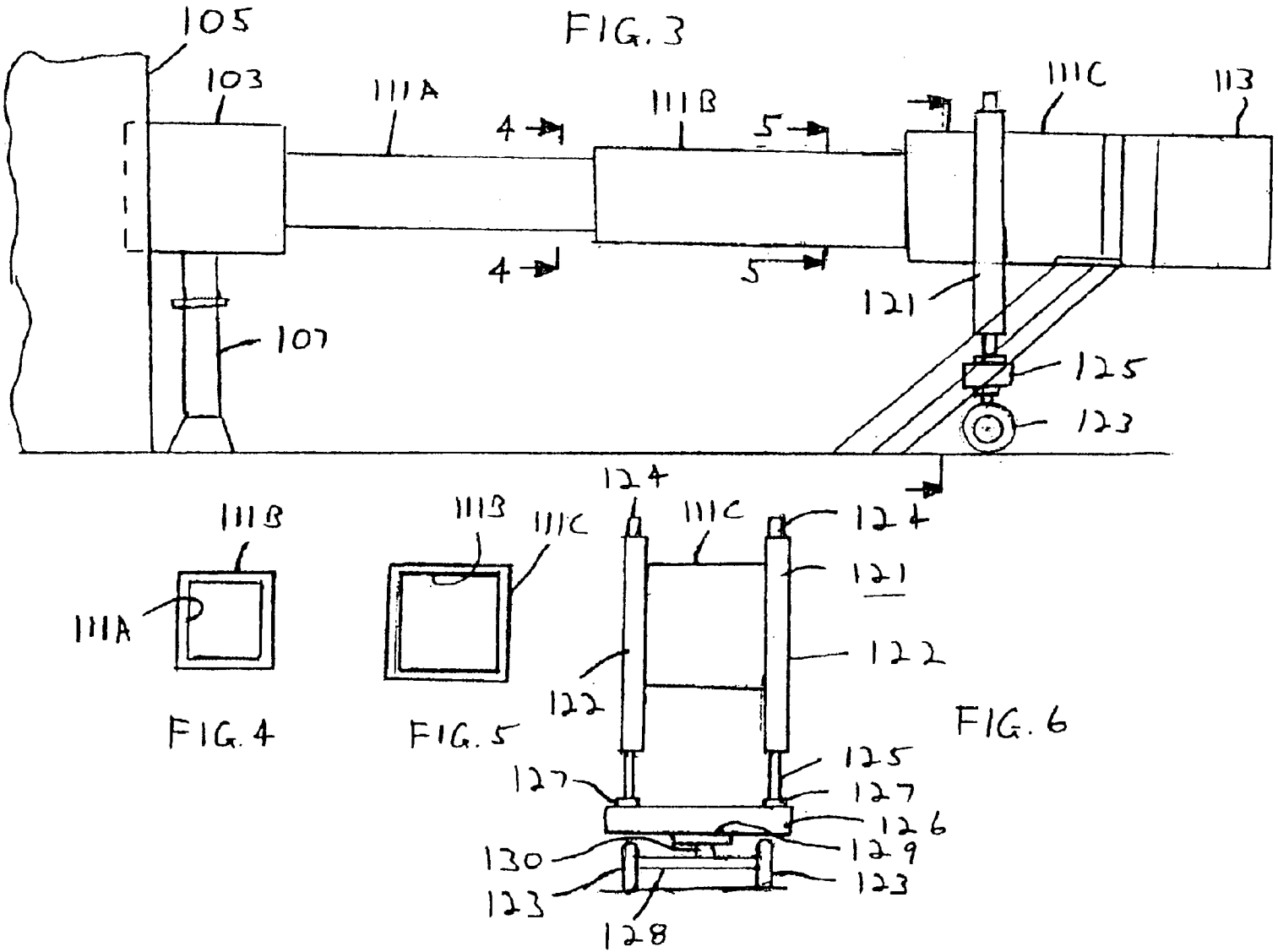
FIG. 3 is a side view of the apparatus of FIG. 1 with the bridge in an expanded position.
FIG. 4 is a line drawing of a cross-section of the apparatus of FIG. 1 as seen along lines 4—4 thereof.
FIG. 5 is a line drawing of a cross-section of the apparatus of FIG. 1 as seen along lines 5—5 thereof.
FIG. 6 is a cross-section of the apparatus of FIG. 1 as seen along lines 6—6 thereof.
Figure 7:
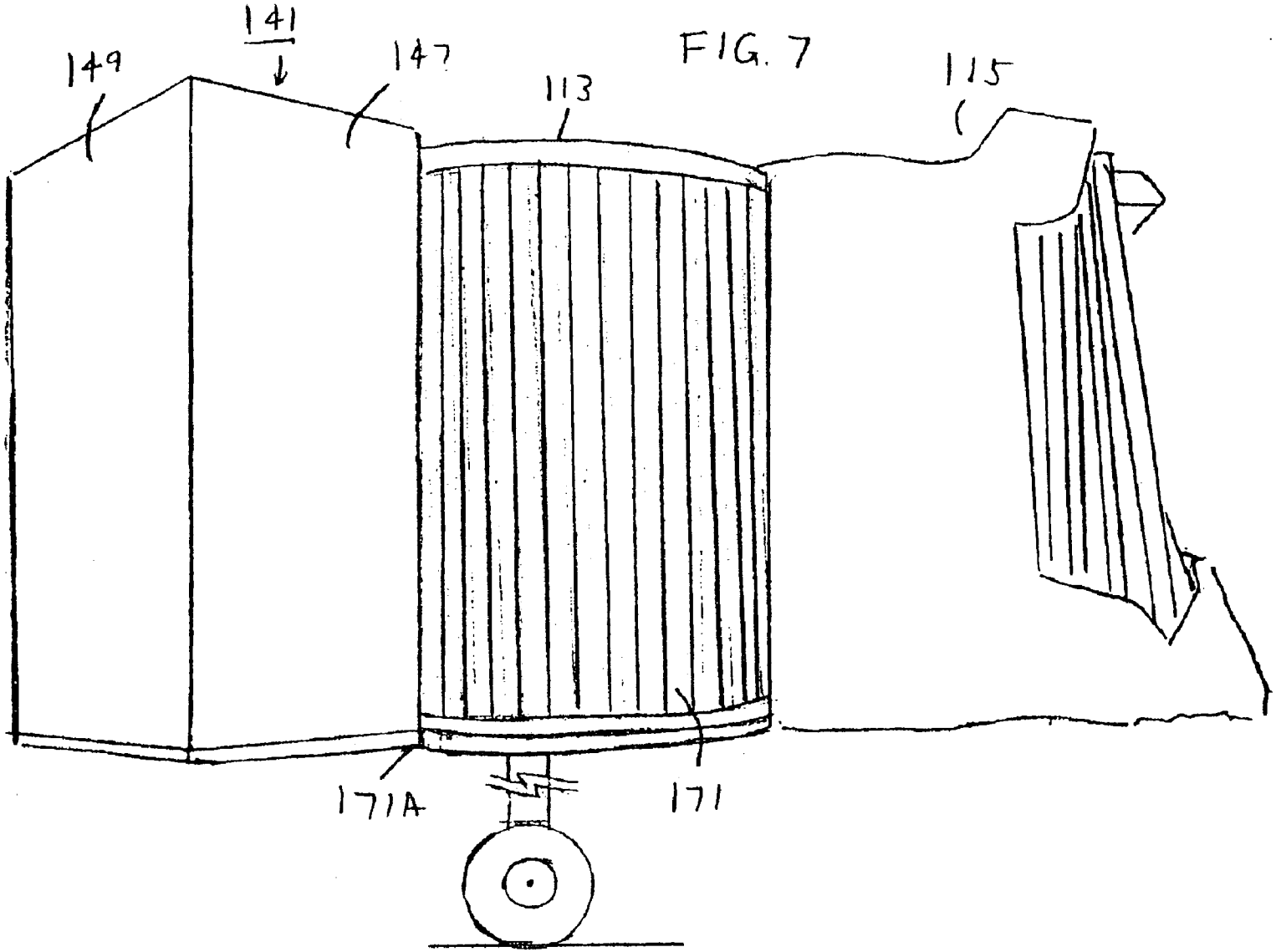
FIG. 7 is a side view of the cab of the bridge of FIGS. 1–3 with the lift of the invention attached to the cab.

Two identical lifting devices 121 comprising hollow members 122 are coupled to opposite sides of the section 111C and to lower wheels 123 for supporting the section 111C and hence the sections 111A and 111B and the cab 113 above the ground with the cab 113 located at a level of the door of the aircraft. Thus passengers can pass from the building 105 to the airplane and vice versa by way of the rotunda, bridge sections 111A, 111B, 111C and the cab 113. A reversible AC electric motor 124 is coupled to or screw member located in each member 122. Each screw member is coupled to a rod 125 which is coupled to a wheel base 126 by way of bearings 127. The base 126 is coupled to a hollow axle 128 by way of a bearing 129 and a rod 130. The axle 128 has two DC controlled motors each of which operates one of the wheels 123 such that they may be moved to be parallel with the length of the bridge 101 as shown in FIGS. 1 and 3 and rotated together in the same direction at the same rpm to move the bridge from a retracted position as shown in FIG. 1 to an expanded position as shown in FIG. 3 and vice versa In moving between the retracted and expanded positions, the section 111B moves radially relative to section A and the section 111C moves radially relative to section 111B. In order to rotate the bridge 101 about the axis 109, one of the wheels 123 may be rotated at a different rpm than the other wheel to allow the wheel assembly 128 to turn about the bearing 129 to allow rotation of the bridge 101 about the axis 109.

Figure 13:
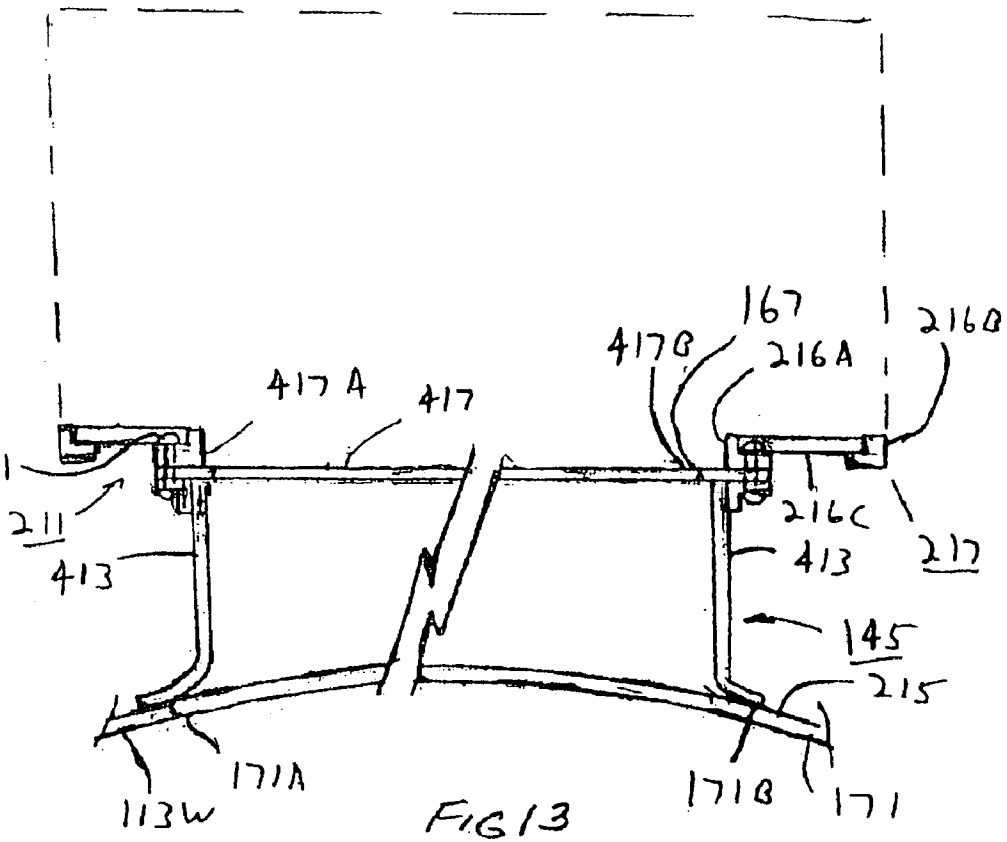
FIG. 13 is a cross-sectional view of the adapter used to secure the lift, to the side of cab.
Figure 12:
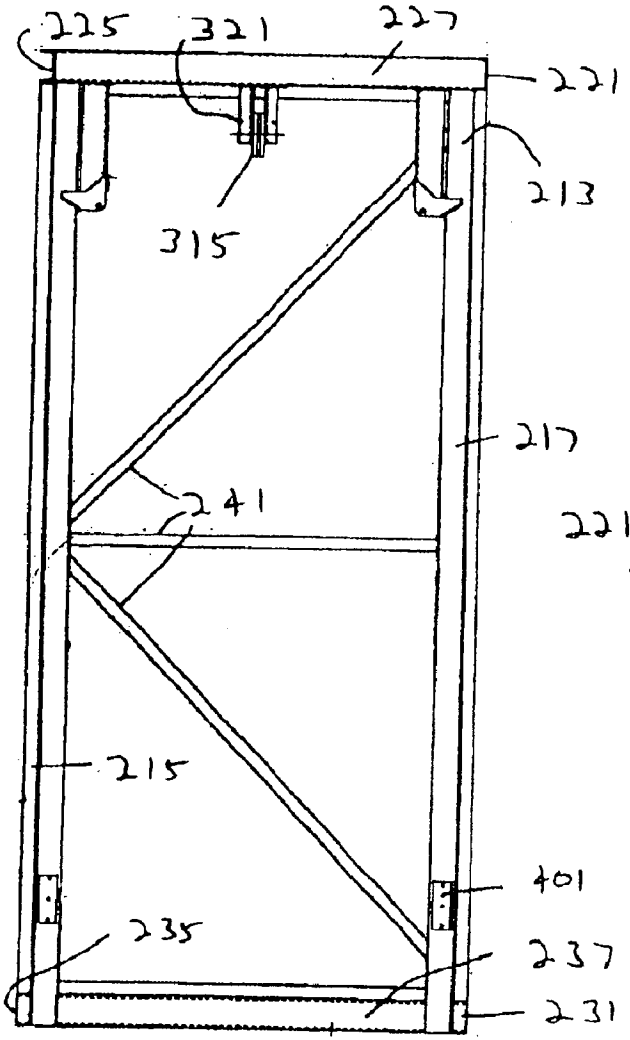
FIG. 12 is a cross-sectional view of the frame of FIGS. 10 as seen along lines 12—12 thereof.
Figure 33:
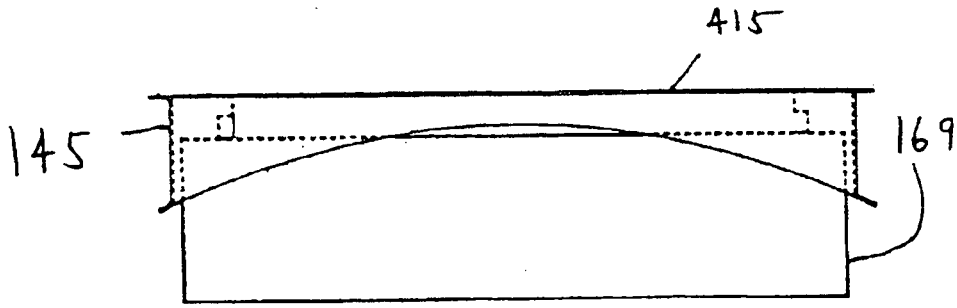
FIG. 33 is a top view of the door structure of FIG. 20.
Figure 32:
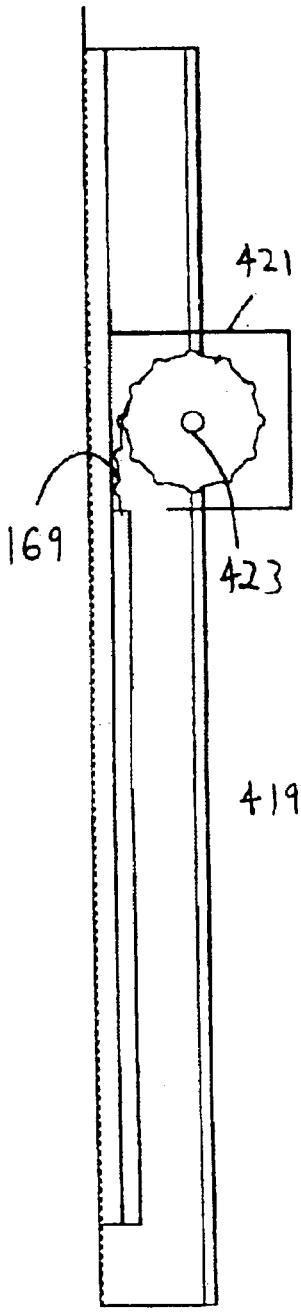
FIG. 32 is a cross-section of the door structure of FIG. 33 as seen along lines 32—32 thereof.
Figure 31:
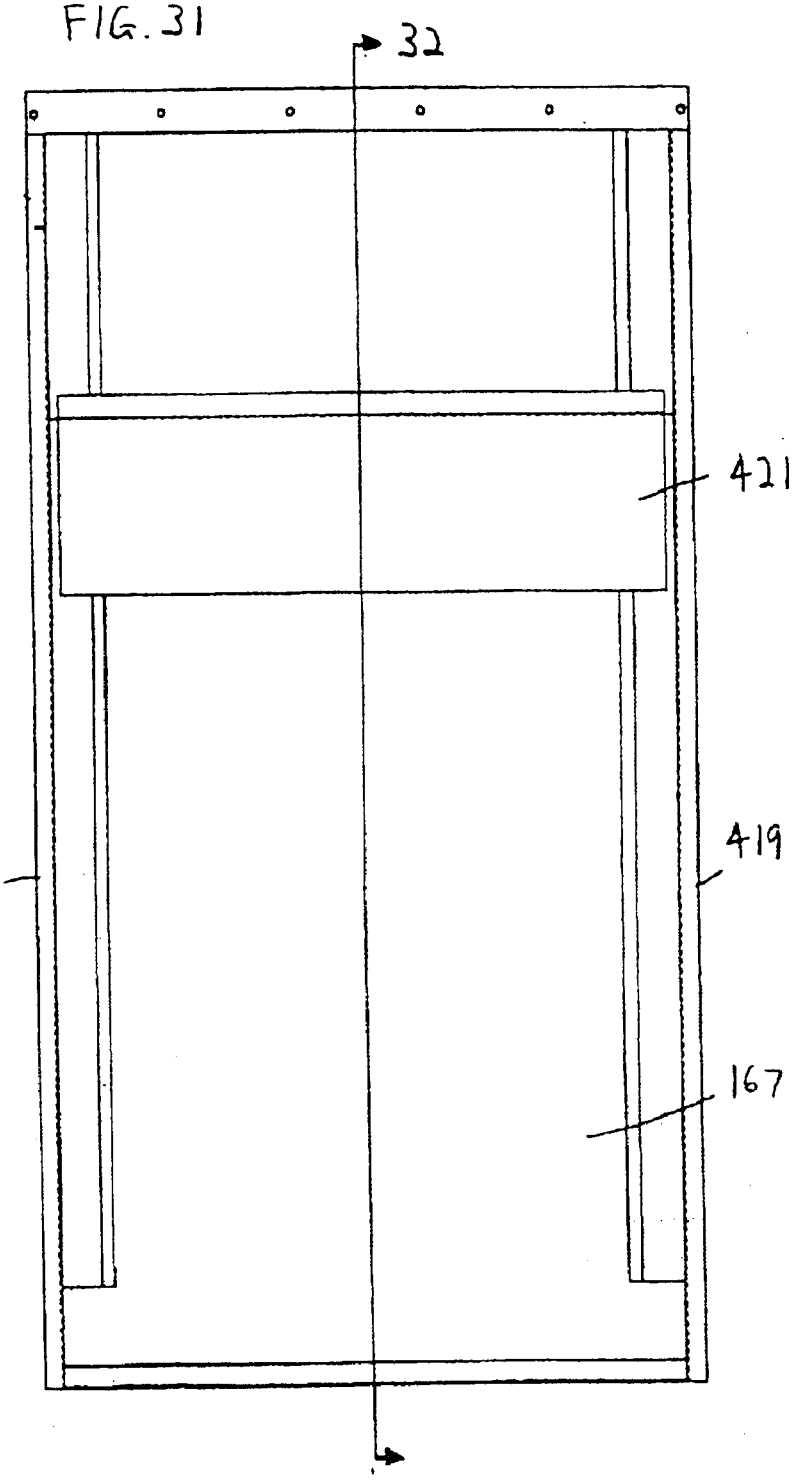
FIG. 31 is a view of the door structure of the frame of the lift.

Coupled to the cab 113 is the lift system 141 of the invention. The lift system 141 comprises a frame 143 (see FIGS. 9–12 and 17-18) which is connected to the cab 113 by an adapter 145 (see FIGS. 13 and 33) on a side nearly opposite the port 115. The bottom of the lift 141 is open. The frame 143 has three outer walls 147,149,151 and a top wall 13. The lift 141 includes a carriage (see FIGS. 8 and 9) 161 with a self-leveling platform 163 that can support a cart 165 (see FIG. 8). The carriage 161 can move downward to the ground through the lower opening of the lift housing and upward to the level of the cab 113 through the lower opening. The lift 141 has an inner door opening 167 and a door 169 leading to the interior of the cab by way of an opening 171 formed through the cab wall (see FIGS. 13 and 31–33) such that when the carriage 161 is in an upper position, passengers can place their large luggage on the cart 165. When the cart 165 is full, the carriage can be lowered to the ground and the can 165 removed and taken to the aircraft cargo hold and the luggage loaded into the aircraft. Upon arrival of the aircraft to its destination, the luggage is loaded onto a similar cart and then taken to a similar lift and raised upward to the bridge to the passengers leaving the aircraft.

By coupling the lift 141 to the cab 113, the lift does not have to be custom built for each bridge since it will always be at a level such that its carriage normally will always contact the ground since the end of the bridge at the cab will always be at the same height for the known smaller regional aircraft. Since the lift is attached to the outer cab 113, it can be used on telescoping bridges of the types shown in FIGS. 1–3 wherein each inner bridge section telescoped into its adjacent outer section.

The cab 113 shown has a movable wall 171 similar to that of a roll up door which can be moved to different positions depending where the port 115 is moved. The port 115 is of the type that can be moved to different positions around the cab 113 between the lift and the end 113A of the cab. The cab 113 next to lift wall 151 has a door 181 with stairs 183 extending between the lower end of the door 181 and the ground.

Referring now to FIGS. 9–13 and 17–19 there will be described the lift 141 in detail. In these drawings the outer walls of the lift housing are not shown. The frame 143 of the lift rectangular in shape at the top and bottom ends, and at the four sides defining an interior space 201 in the form of a rectangular prism in which is located the carriage 161. Four vertical members 211, 213, 215, 217 have connected thereto four horizontal members 221, 223, 225, 227 at the top and four horizontal members 231, 233, 235, 237 at the bottom to form the frame 141. Cross members 241 and 243 are provided for additional support. The inner frame members 211 and 217 each comprises two L-shaped metal members 216A and 216E with cross braces 216C with members 216A having apertures 219 for receiving bolts 221 for attaching the frame 143 to the adapted 145. The adapter 145 is attached to the side of the cab 115 by bolts (not shown). The bottom of the lift frame 141 formed by members 231, 233, 235 and 237 defines a rectangular opening 245 for passage of the carriage 161.

Referring to FIGS. 9 and 14–19, the carriage 161 is rectangular in shape at the top and bottom ends and at its four sides defining an interior space 251 in the form of a rectangular prism. Four vertical members 261, 263, 265, and 267 have connected thereto, four horizontal members 271, 273, 275, 277 near the top four lower horizontal members 281, 283, 285, and 287 and four horizontal members 191, 293, 295, and 297 at the bottom. Four angled members 301, 303,305, and 307 are connected to horizontal members 273 and 277 extend downward and are connected to a plate 309 which is connected to bars all. Bars 311 are connected to member s 281 and 285.

A U-shaped member 313 is connected to plate 309 to allow a cable 315 to raise and lower the carriage 161. The cable 315 extend around a sheave 317 and is connected to a reversible electrically operated winch 319. The sheave is rotatably supported by plates 321 which are connected to a plate 323 which is connected to horizontal members 221 and 225 of lift frame 141. The winch 319 is supported by a plate 325 which is connected to vertical members 211 and 213.

Figures 18, 19, 20, 21, 22:
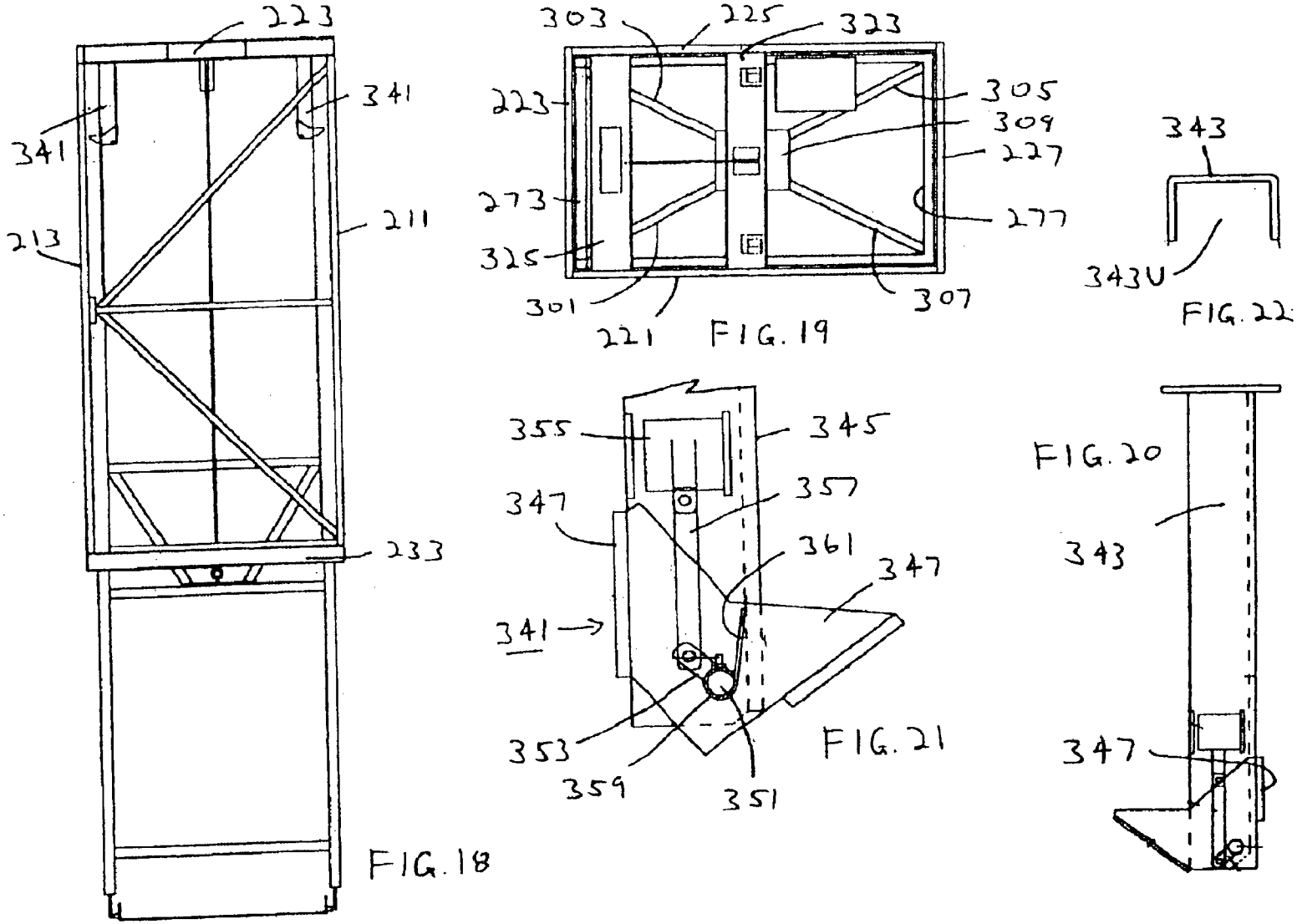
Figure 25:
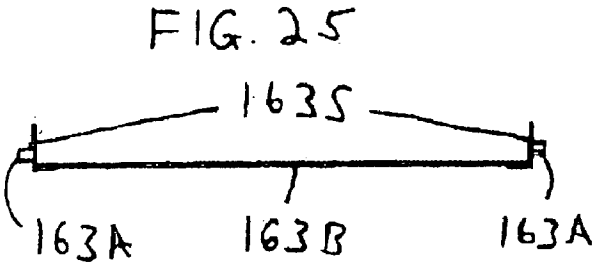
FIG. 25 is an end view of the platform of FIG. 24.
Figure 26:
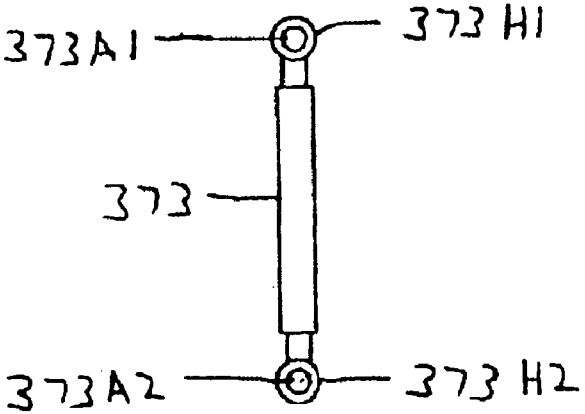
FIG. 26 illustrates one of the ball joint linkages which couples the edges of the platform to the carriage frame.
Figure 24:
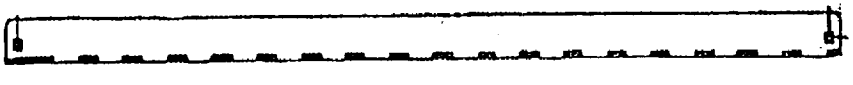
FIG. 24 with the catch in a safety position.
Figure 23:
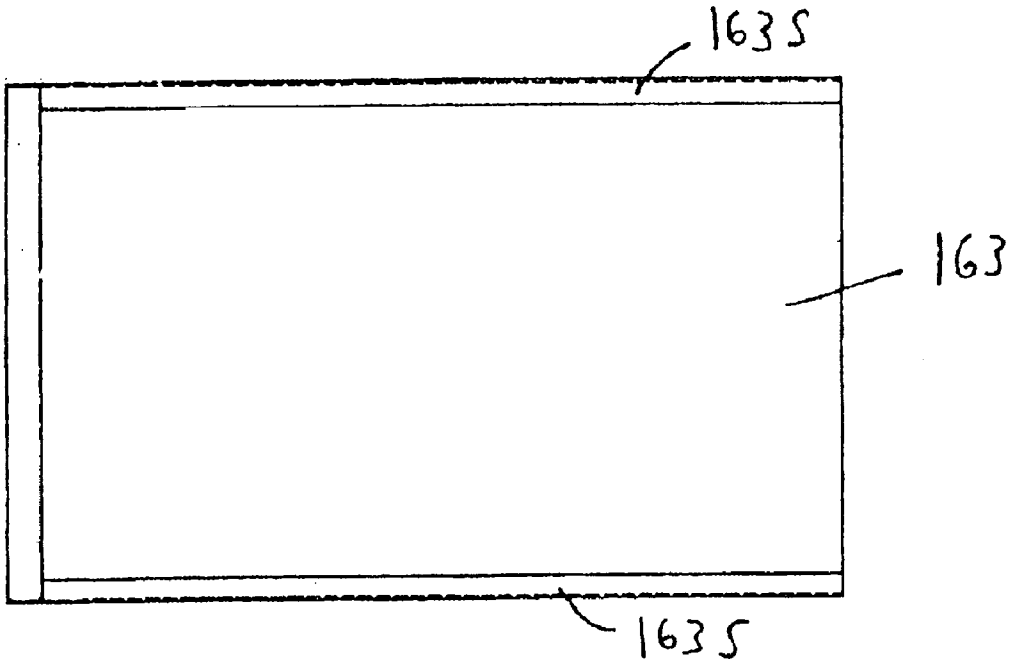
FIG. 23 is a bottom view of the platform of the carriage of the lift.
Figure 28:
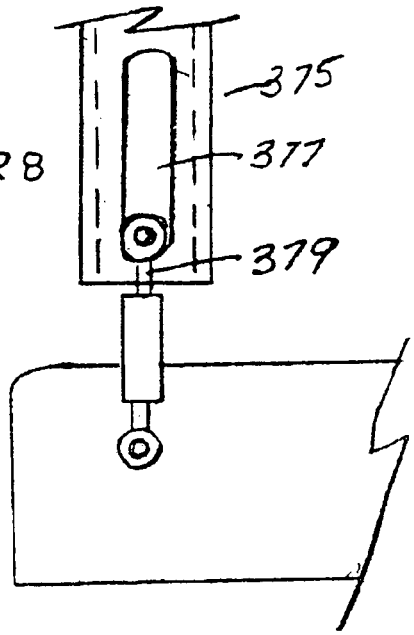
FIG. 28 is a view of the structure of FIG. 27 as seen along lines 28—28 thereof.
Figure 27:
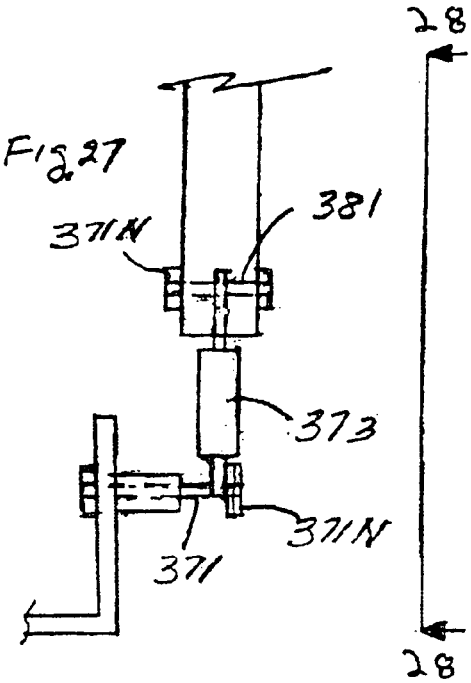
FIG. 27 illustrates one of the ball joints coupling one leg of the carriage to one edge of the platform.
Figure 29:
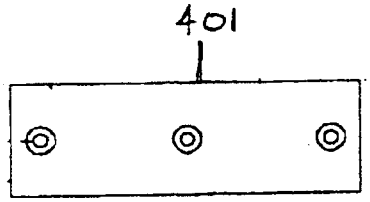
FIG. 29 illustrates one of the wear strips of the carriage and lift frame.
Figure 30:
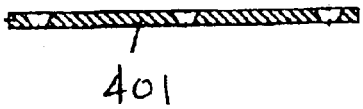
FIG. 30 is a cross-sectional view of the wear strip of FIG. 29.

Two safety catch assemblies 341 are connected to plate 323 to prevent the carriage 161 from failing in the event the cable 315 breaks. The two catch assemblies are identical and only one catch assembly 341 will be described. Referring to FIGS. 20–22 the catch assembly 341 comprises a U-shaped support 343 and a catch member 347 which is pivotally coupled to the member 343 by a rod 351 on the outside of the U-member 343. Also fixedly coupled to the rod 351 inside the U of the support 343 is a linkage 353. A solenoid 355 inside the U of the support 343 has a linkage 357 pivotally coupled to the linkage 353. A tension spring 359 is attached to the rod 351 and has its arm 361 located against a wall. When the solenoid 355 is electrically energized, the linkage 357 is moved downward moving the catch member 347 upward out of the way as shown on the right side of FIG. 20 to allow the carriage to move downward. When the solenoid 355 is deenergized the torsion spring 359 urges the catch member 347 of the support 343 to a safety position as shown in FIG. 21. When the carriage 161 moves upward, the solenoids 355 are de-energized and the upper horizontal members 271 and 275 of the carriage 161 push the latches 347 out of the way and move upward above the catch members 347. The springs 359 return the latches 347 to the safety positions as shown in FIG. 21. Luggage from passengers in the cab 113 of the bridge 101 then may be loaded on to the carriage 161. In order to move the carriage 161 downward to the ground the solenoids 355 are energized causing the catch members 347 to be moved upward out of the way of the carriage arms 271 and 275.

Figure 8:
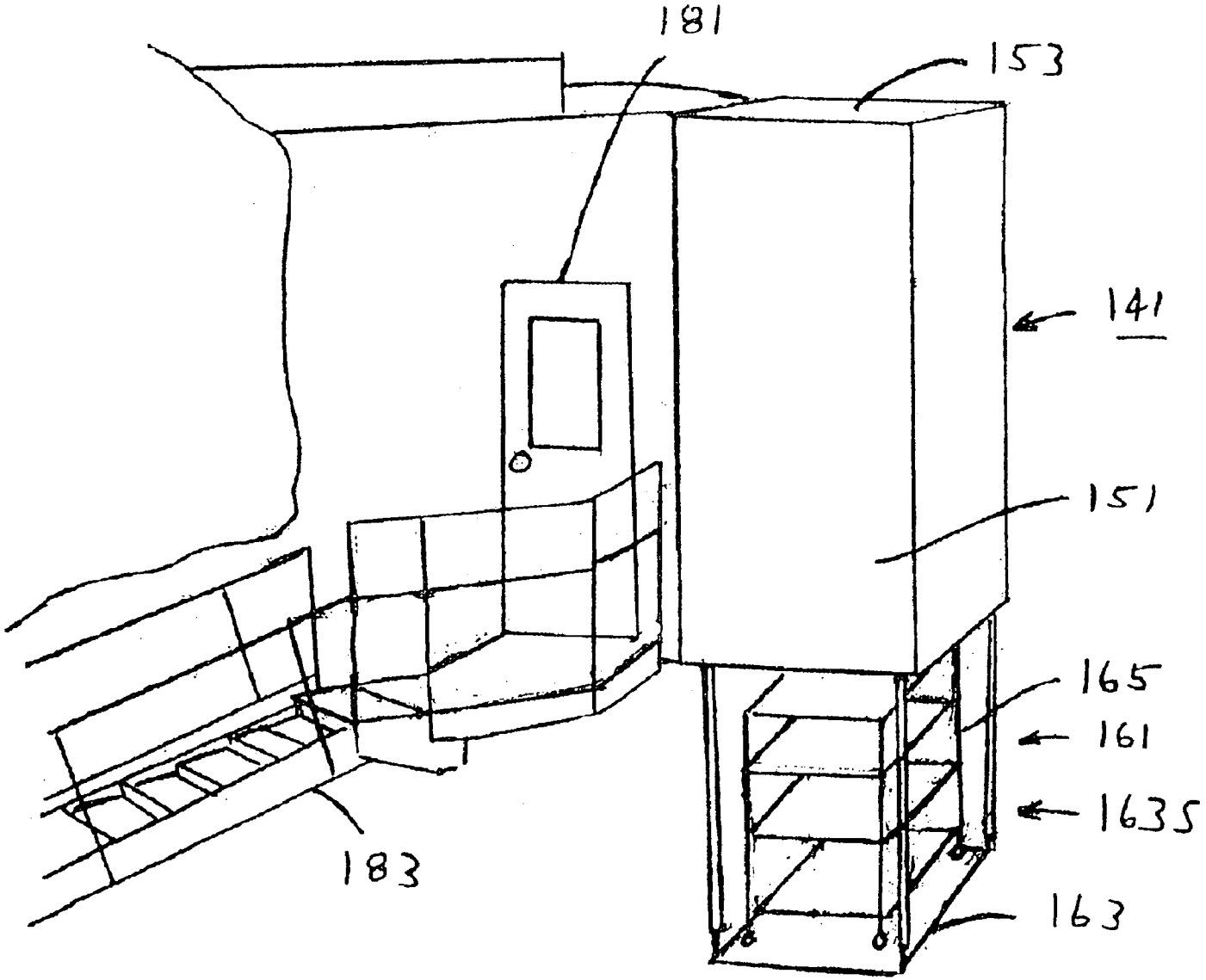
FIG. 8 is at different side view of the cab of the bridge of FIGS. 1–3 showing a third side of the lift of the invention with its carriage in a lowered position.
Figure 9:
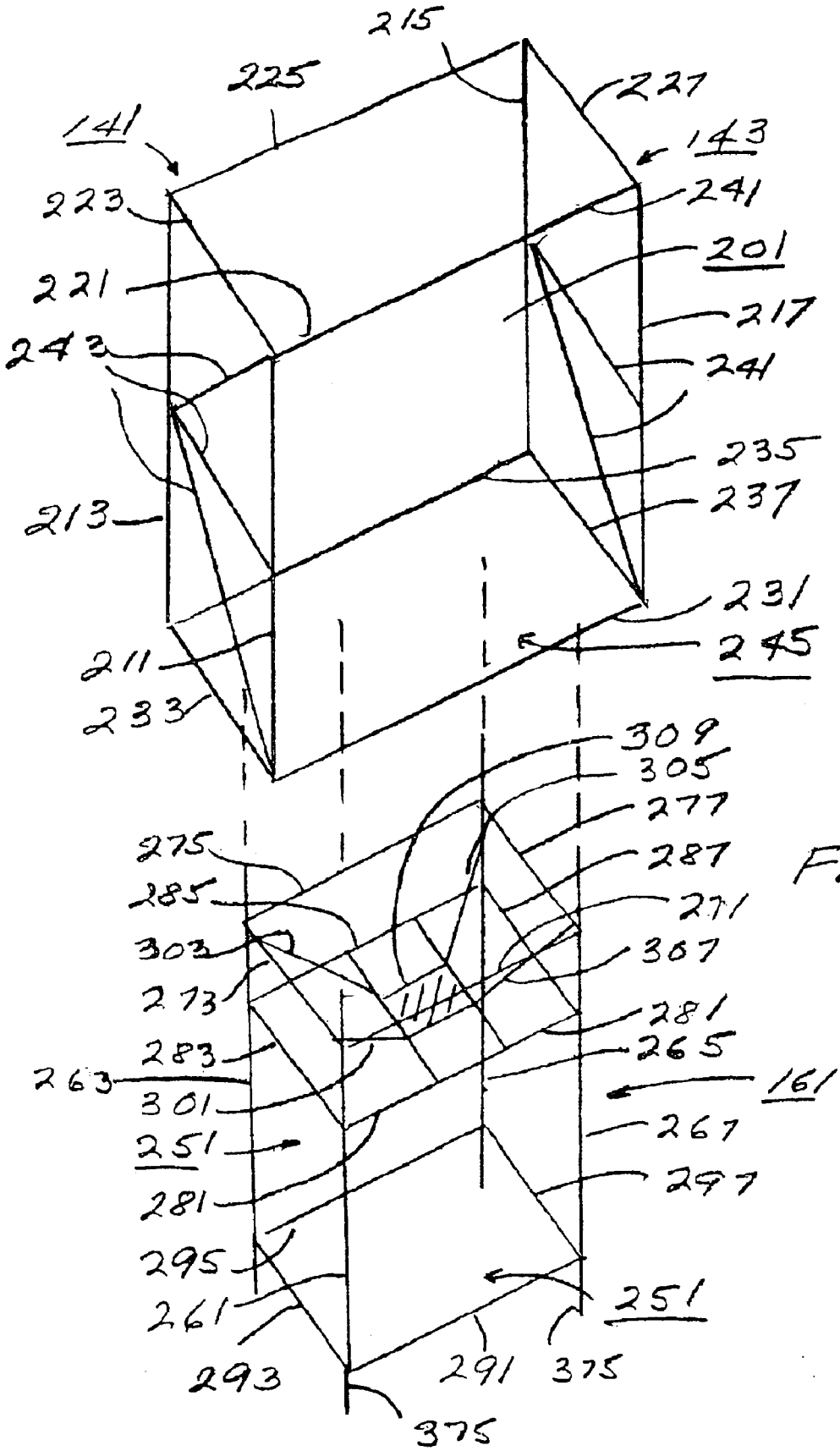
FIG. 9 is a line drawing of the lift and carriage of the invention.
Figures 10, 11:
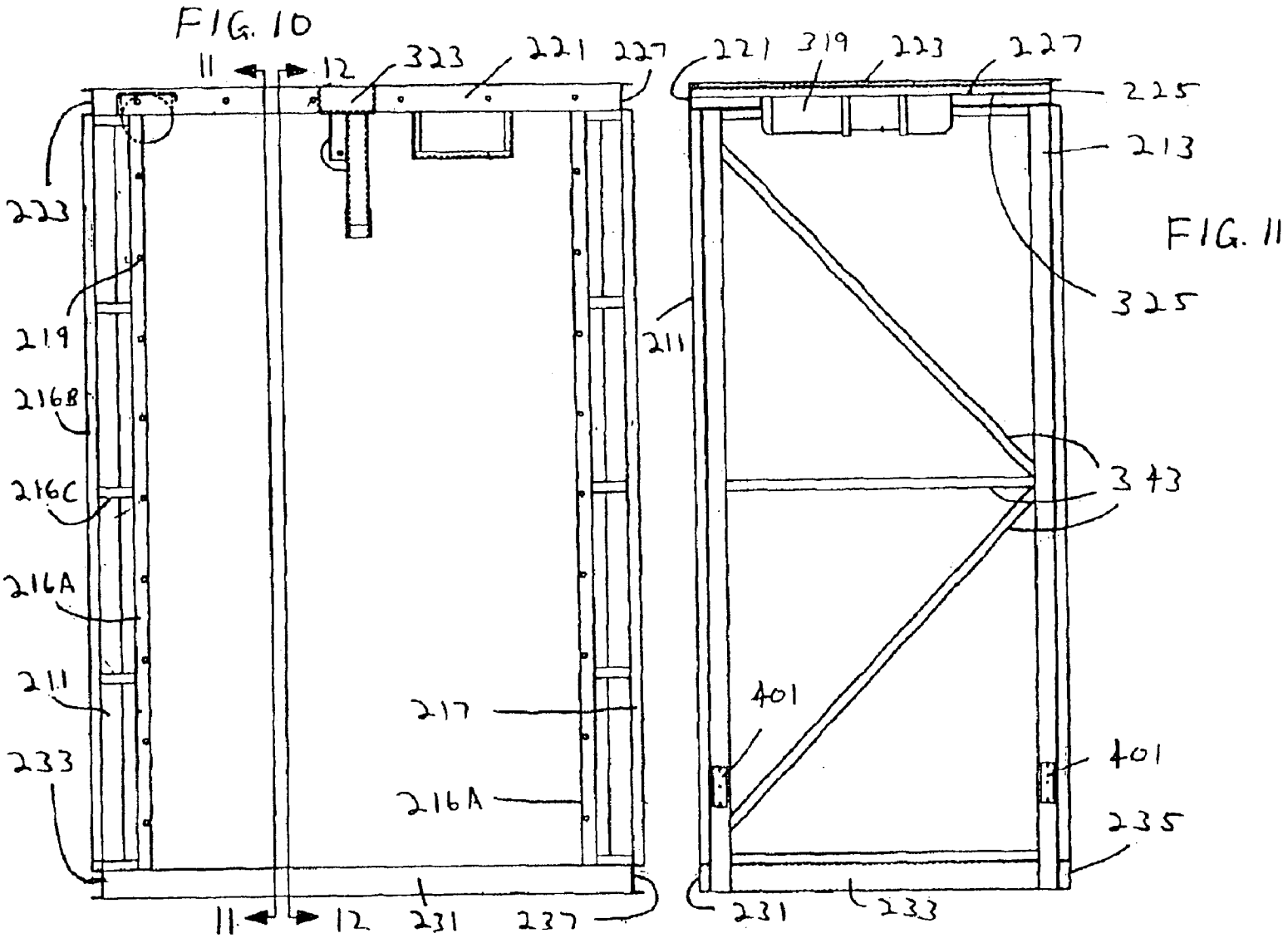
FIG. 10 is an inner side view of the frame of the lift with the outer walls of the housing removed.
FIG. 11 is a cross-sectional view of the frame of FIG. 10 as seen along lines 11—11 thereof.
Figure 14:
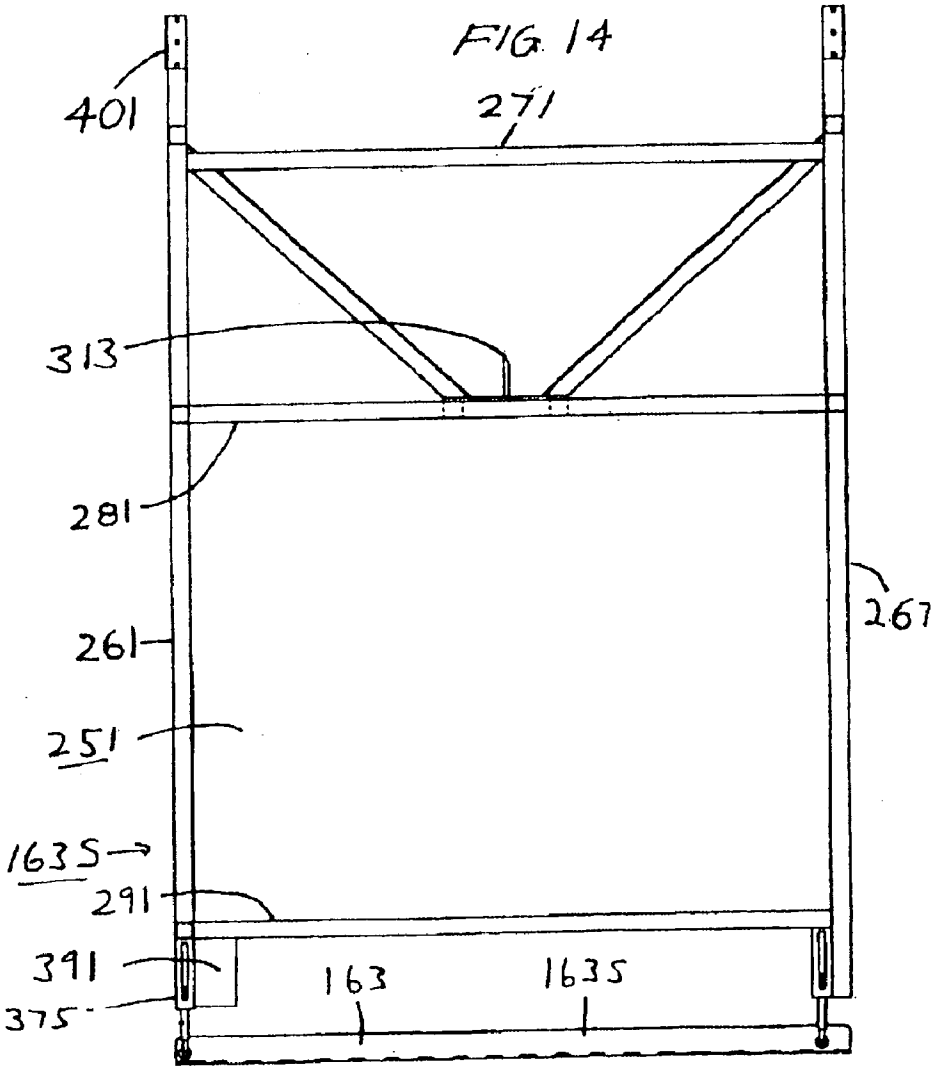
FIG. 14 is a side view of the carriage of the lift.
Figure 15:
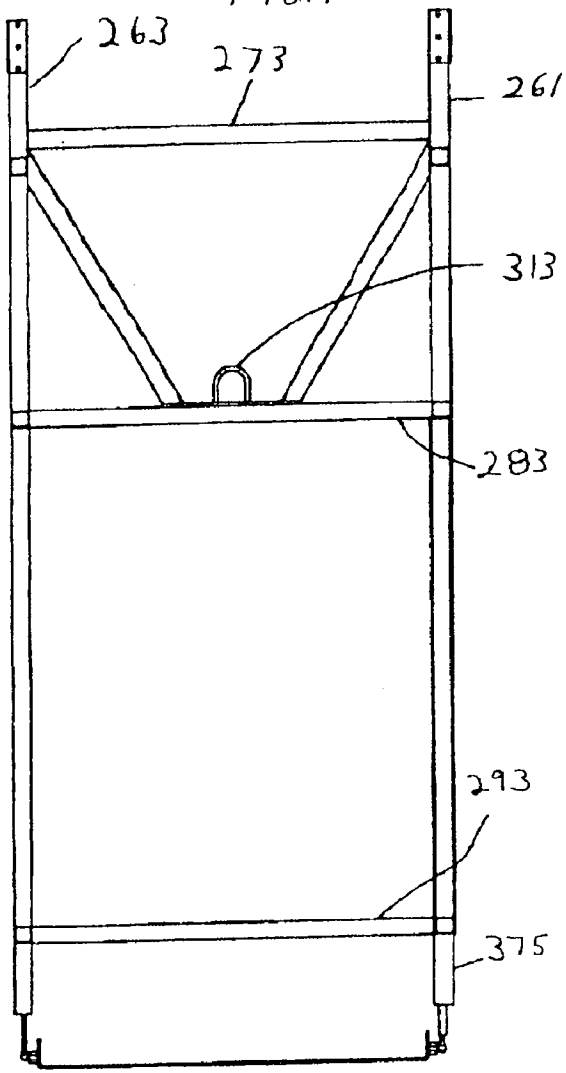
FIG. 15 is a left end view of the carriage of FIG. 14.
Figure 17:
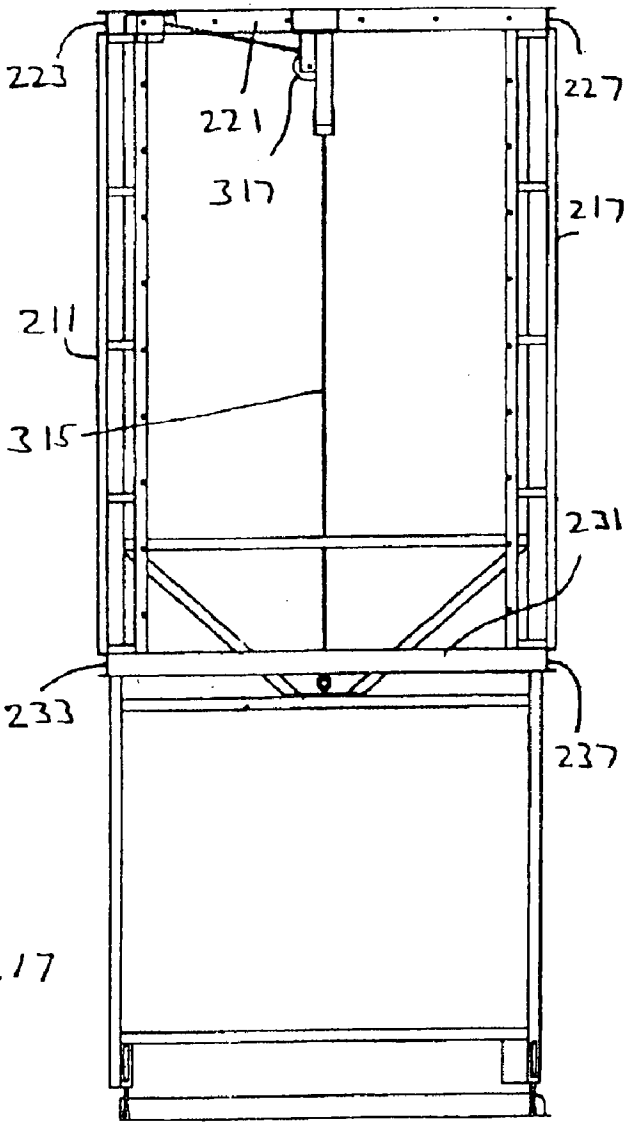
FIG. 17 is an inner side view of the frame of the lift with the carriage located therein.
Figure 16:
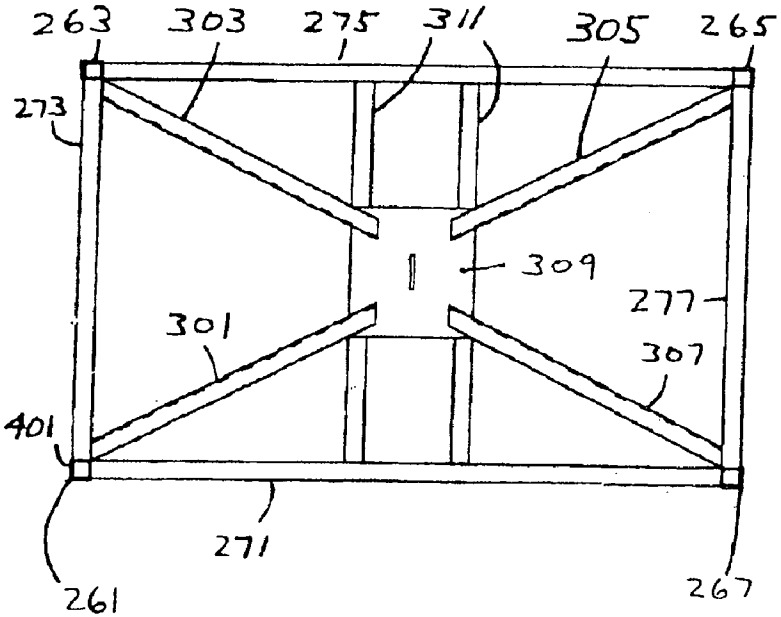
FIG. 16 is a top view of the carriage of FIGS. 14.

Referring now to FIGS. 23–28, the platform 163 of the carriage 161 comprises a flat bottom member 163B having two side members 163S. Each side member 163S has two tubular apertures 163A for receiving a bolt 371. Four ball joints 373 are used to couple the platform 161 to the four legs 375 of the carriage 161. Each leg 375 has an elongated slot 377 formed therethrough with a lower aperture 379 extending to the slot 377. Each ball joint 373 has two opposite heads 373H1 and 373H2 with apertures 373A1 and 373A2 extending therethrough. For each leg 375, a bolt 371 extends through the aperture 373A2 and a bolt 381 extends through the aperture 373A1 and through the slot 377 of the leg. Nuts 371N and 381N secure the ball joint to the bolts 371 and 381 respectively. Each ball joint 373 can pivot about the bolts 371 and 381 and move up and down in the slot 377. As the carriage 161 is lowered to the ground, it will be tilted a small amount since the bridge 101 is tilted downward in one example, of the order of 1 inch for each 12 inches of length of the bridge. In FIGS. 8 and 14 the outside edge of the platform 163 is indicated at 163S. Thus the outside edge of the carriage and its platform 163 will touch the ground initially. The carriage can be lowered further until the platform 163 engages an electrical switch 391 (see FIG. 14) which produces a signal to stop the motor of the winch 319. Referring to FIGS. 11, 12, 14, 15, 29, 30 plastic wear strips 401 are attached to the outside comers of the vertical frame members 261, 263, 265, 267 of the carriage 141 at their upper ends and on the inner sides of the frame members 211, 213, 215, 217 of the lift frame 143 to guide vertical movement of the carriage 161 as it moves up and down in the lift frame 143. The strips 401 may be formed of UHMW Referring now to Figs. to FIGS. 2, 7, 13 and 31–33 the wall 171 of the cab 113 terminates at 171A leaving an opening between lines 171A and 171B. The adapter 145 has side walls 413 attached to the outside of the cab around the opening between lines 171A and 171B. The outer side 415 of the adapter 145 has an opening 417 formed therethrough between lines 417A and 417B. Vertical supports 419 are secured to the outer wall 413 of the adapter next to the opening 417. Secured to the supports 419 at an upper level is a frame 421 which supports a rod 423. The rod 423 supports the roll up door 169 such that the door 169 can be pulled down to close the opening 417 or moved up to allow access to the opening 417.

Figures 34, 36:
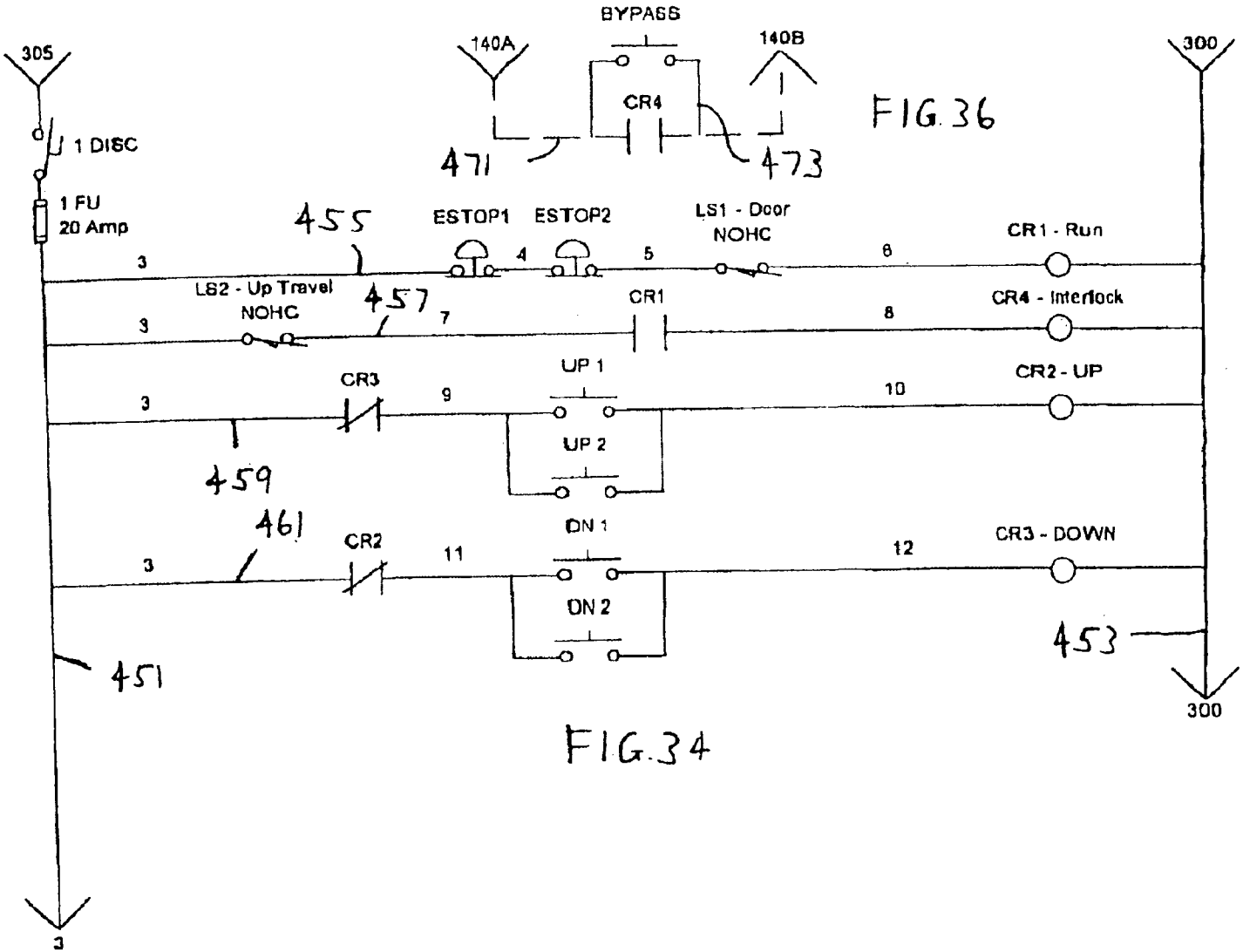
FIGS. 34 and 35 are an electrical schematic of the control system for the bridge and lift Lines 451A and 453A of FIG. 34 are connected to lines 451B and 453B respectively of FIG. 35.
FIG. 36 is an electrical schematic of additional features of the control system.
Figure 35:
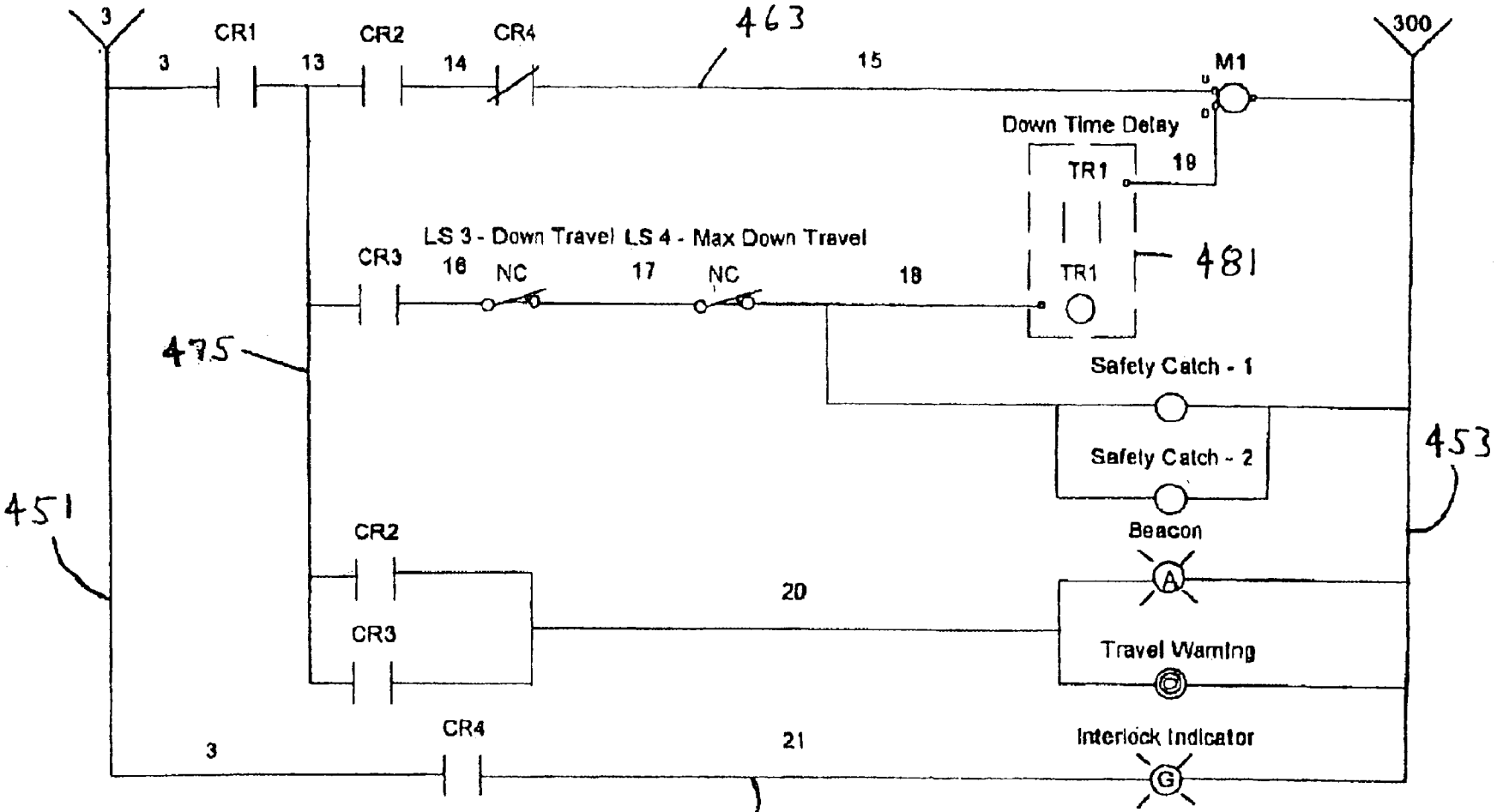
Figure 38:
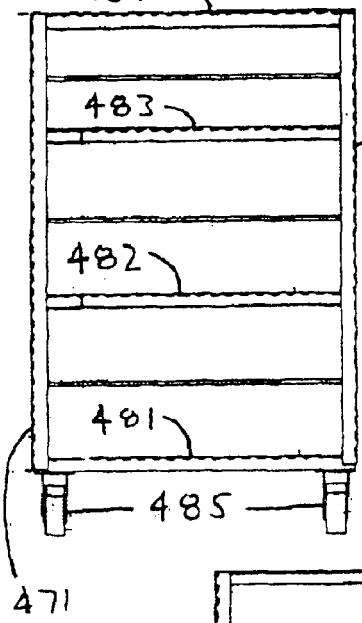
FIG. 38 is an end view of the cart.
Figure 39:
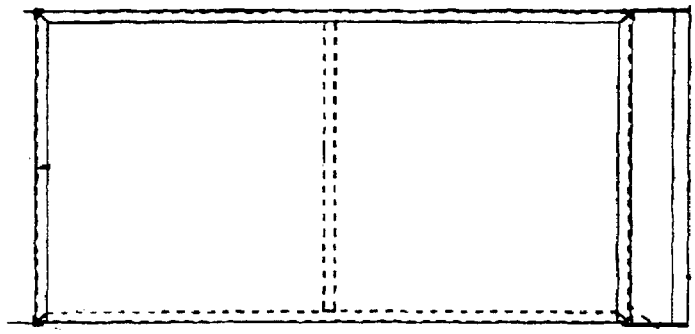
FIG. 39 is a top view of the cart.
Figure 37:
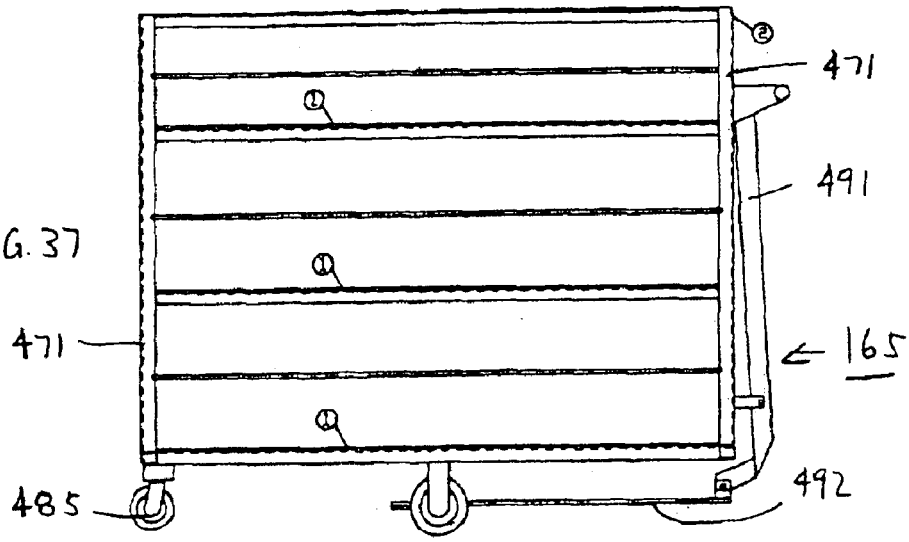
FIG. 37 is a side view of a cart used with the lift.
Figure 40:
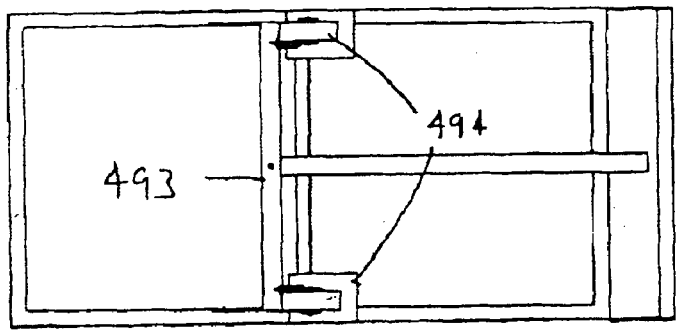
FIG. 40 is a bottom view of the cart.

Referring to FIGS. 34–36, the electrical system of the bridge 101 and lift 141 will be described. Leads 451 and 453 are coupled to 110 Volts A.C. Leads 455, 457, 459, 461, 463 and 465 are connected between leads 451, 453.

Member 1DISC is a disconnect switch and member 1FU is a fuse ESTOP1 and ESTOP2 are normally closed interior and exterior emergency stop switches.

Switch LS1 is a normally open switch held closed by the lower end of the roll-up door 169 when it is in a closed (down) position. Switch LS2 is a normally open switch held closed by the lift 141 when the carriage 161 is in an up position. In this condition, coil of relay CR1 is energized. This closes normally open contacts CR1 of FIG. 34 which closes normally open contacts CR4 of FIG. 36. The circuit of FIG. 35 allows the bridge 101 to be driven. Contacts CR4 are in electrical lead 471 which applies AC power to the electrical motors of the bridge 101 when contacts CR4 of FIG. 36 are closed.

If the door 169 is not down and the carriage 161 is not up, the bridge 101 cannot be driven (expanded or retracted or rotated) unless the by pass switch 473 is closed. It takes two persons to press the by-pass switch 473 and one to drive the bridge 101.

Relay coils CR2 and CR3 control the up and down movement of the carriage 161. When the door 169 is closed and LS1 is closed by the door, relay coil CRI is energized which closes normally open contacts CR1 of FIG. 35. This applies a voltage to lead 475 of FIG. 35. If the lift is in a down position and the up button UPI is pressed, the CR2 relay is energized which closes the upper CR2 contacts of FIG. 35 causing the winch motor M1 to operate to move the carriage upward, and closes the lower CR2 contacts of FIG. 35 which actuates a beacon light and a travel warning light.

When the lift 141 reaches the up position, normally open switch LS2 is closed and relay CR4 is energized which opens the upper CR4 contacts of FIG. 35 and closes the lower CR4 contacts of FIG. 35. This stops the motor M1 and actuates the interlock indicator If the lift door is closed and the carnage is at the up position, relay CR1 is energized. If the down button DN1 is pushed, the CR3 relay is energized which closes contacts CR3 and current is applied to the two solenoids of the safety catches, by way of normally closed switches LS3 and LS4, which moves their latches 347 out of the way. LS3 is the limit switch 391 of the platform 163 which is normally closed. When the platform 163 contacts the ground it opens LS3 and stops downward movement of the carriage.

Switch LS4 is normally closed. Its purpose is to stop downward travel of the carriage if the bridge is too high and the platform of the carriage cannot contact the ground. It is opened by a lower trip member (not shown) which is attached to the outside of the housing of the lift 141. When the down button is pushed, the current to the motor M1 is delayed by delay circuit 481 to allow the safety catch relays to be actuated first to move the latches 347 out of the way before the motor M1 turns the winch to move the carriage down.

The interlock indicator is a great light which is actuated when the carried door is closed and the carriage is in the up position. The light is visible to the operator.

Referring to FIGS. 37–40, the cart 165 comprises four legs 471 (only three are shown) for supporting four shelves

481–484. A wheel 485 is connected to the lower end of each leg although the rear wheels are not shown. Members 491, 492, and 493 and wheels 494 form a brake for the cart 165.

What is claimed is:

1. A system for use for the passage of persons and items between an airport building and an airplane, comprising:

a walkway comprising;

a passage means supported for rotation about a vertical axis next to said building;

a cab having a first port adapted to be coupled to a port of an airplane for the passage of persons;

a plurality of sections with each section having a rear end and a front end with a passage formed there-through;

said plurality of sections comprising a rear section having its rear end coupled to said passage means and a forward section having its forward end coupled to said cab;

each of said sections being telescopically coupled to an adjacent section with said front end of said section adjacent to said forward section being movable within said forward section, such that said walkway from said passage means may be expanded and contracted;

said cab having a second port for the passage of luggage and other items;

a housing coupled to the exterior of said cab with an opening located in line with said second port;

said housing having a lower opening;

a carriage supported for movement in said housing for supporting luggage and other items;

means for lowering said carriage downward to the ground and upward into said housing by way of said lower opening for transporting luggage and other items between said cab and the ground.

2. The system of claim 1, wherein:

said housing comprises an upper end and a lower end with surrounding side walls located between said upper and lower ends defining an interior upper zone extending between said upper and lower ends;

said second port extends into said housing above said lower end in communication with said interior zone;

support structure coupled to said housing for supporting said housing including said lower end above and spaced from the ground;

said lower end of said housing having said lower opening formed therethrough;

said carriage being supported for movement between said interior zone and the ground by way of said lower opening, for carrying luggage and other items between said interior zone and the ground;

said carriage comprising a plurality of leg members having lower ends;

a platform for supporting luggage and other items, coupled to said lower ends of said leg members by coupling means such that said platform is located below said lower ends of said leg members and can engage the ground when said carriage is lowered to the ground said lower ends of said leg members and said platform may move toward and away from each other respectively;

an electric motor, an electrical switch coupled to said carriage at a position to be controlled by said platform when said platform engages the ground for shutting off said motor.

3. The system of claim 2, comprising:

a winch coupled to said housing;

a flexible line having a first end coupled to said carriage and a second end coupled to said winch; said electric motor being a reversible motor for rotating said winch in a first direction to lower said carriage and for rotating said winch in a second direction for raising said carriage;

a safety assembly for preventing said carriage from falling in the event said flexible line breaks;

said safety assembly comprising a movable catch;

spring means for normally urging said catch in a first position to prevent said carriage from falling;

a solenoid for moving said catch to a second position to allow said carriage to move from an upper position to a lower position;

said catch being movable from said second position to said first position by said carriage when said carriage is moved upward to an upper position.

4. The system of claim 3, comprising:

an electrical system for moving said bridge;

a door for opening and closing said second port;

circuitry including a first switch for sensing when said door is in a closed position and a second switch for sensing when said carriage is in an up position and for allowing said electrical system to move said bridge only if said door is in a closed position and said carriage is in an up position.

5. The system of claim 1, wherein:

said means for lowering said carriage downward to the ground and upward into said housing by way of said lower opening comprises: a winch coupled to said housing; a flexible line having a first end coupled to said carriage and a second end coupled to said winch;

and an electric motor for operating said winch to move said carriage upward and downward;

said carriage comprises a plurality of leg members having lower ends; and a platform for supporting luggage and other items, coupled to said lower ends of said leg members by coupling means such that said platform is located below said lower ends of said let members and can engage the ground when said carriage is lowered to the ground;

said lower ends of said leg members and said platform may move toward and away from each other;

an electrical switch coupled to said carriage at a position to be controlled by said platform when said platform engages the ground for shutting off said motor.

* * * * *